US008599976B2

(12) United States Patent
Gomadam et al.

(10) Patent No.: US 8,599,976 B2
(45) Date of Patent: Dec. 3, 2013

(54) MULTI-USER MULTIPLE INPUT MULTIPLE OUTPUT (MU-MIMO) RECEIVER

(75) Inventors: Krishna Srikanth Gomadam, Sunnyvale, CA (US); Daniel Yellin, Ra'anana (IL); Ezer Melzer, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 463 days.

(21) Appl. No.: 12/725,222

(22) Filed: Mar. 16, 2010

(65) Prior Publication Data
US 2010/0232553 A1 Sep. 16, 2010

Related U.S. Application Data

(60) Provisional application No. 61/160,546, filed on Mar. 16, 2009.

(51) Int. Cl.
H04B 1/10 (2006.01)

(52) U.S. Cl.
USPC .......................................... 375/346; 375/299

(58) Field of Classification Search
USPC .................. 375/346, 340, 324, 299, 285, 267; 455/500, 501
See application file for complete search history.

(56) References Cited

U.S. PATENT DOCUMENTS

| 2007/0183380 | A1* | 8/2007 | Rensburg et al. | 370/338 |
| 2008/0008110 | A1* | 1/2008 | Kishigami et al. | 370/310 |
| 2008/0225960 | A1* | 9/2008 | Kotecha et al. | 375/259 |
| 2008/0292012 | A1 | 11/2008 | Kim et al. | |
| 2008/0304463 | A1* | 12/2008 | Borkar et al. | 370/342 |
| 2009/0122857 | A1* | 5/2009 | Li et al. | 375/239 |
| 2009/0161605 | A1* | 6/2009 | Shen et al. | 370/328 |
| 2009/0181708 | A1* | 7/2009 | Kim et al. | 455/501 |
| 2011/0034192 | A1* | 2/2011 | Lim et al. | 455/501 |

OTHER PUBLICATIONS

Yoshitaka Hara et al: "Spatial Scheduling With Interference Cancellation in Multiuser MIMO Systems", IEEE Transactions on Vehicular Technology, IEEE Service Center, Mar. 1, 2008, pp. 893-905, vo. 57, No. 2, Piscataway, NJ.
Maddah-Ali M A et al: "Communication Over MIMO X Channels: Interference Alignment, Decomposition, and Performance Analysis", IEEE Transactions on Information Theory, IEEE, Aug. 1, 2008, pp. 3457-3470, vol. 54, No. 8, US.
Matted Trivellato et al: "Antenna Combining and Codebook Design for the MIMO Broadcast Channel with Limited Feedback", Signals, Systems and Computers, 2007. ACSSC 2007. Confernece Record of the Forty-First Asilomar Conference on, IEEE, Nov. 4, 2007, pp. 302-308, Piscataway, NJ.
Bala E et al: "Zero-Forcing Beamforming Codebook Design for MU-MIMO OFDM Systems", Vehicular Technology Conference, 2008. VTC 2008-Fall. IEEE 68th, Sep. 21, 2008, pp. 1-5, Piscataway, NJ
Samir Medina Perlaza et al: "Opportunistic interference alignment in MIMO interference channels", Personal, Indoor and Mobile Radio Communications, 2008. PIMRC 2008. IEEE 19th International Symposium on, Sep. 15, 2008, pp. 1-5, Piscataway, NJ.

* cited by examiner

Primary Examiner — Aristocratis Fotakis

(57) ABSTRACT

Some of the embodiments of the present disclosure provide a method within a wireless communication network, the method comprising, receiving by a user equipment (UE), a signal and interference component, wherein the interference component was transmitted in an unknown direction; and decoding, by the UE, the signal based at least in part on the interference component. Other embodiments are also described and claimed.

3 Claims, 6 Drawing Sheets

MULTI-USER MULTIPLE INPUT MULTIPLE OUTPUT (MU-MIMO) RECEIVER

CROSS REFERENCE TO RELATED APPLICATIONS

The present application claims priority to U.S. Provisional Patent Application No. 61/160,546, filed Mar. 16, 2009, the entire specification of which is hereby incorporated by reference in its entirety for all purposes, except for those sections, if any, that are inconsistent with this specification.

TECHNICAL FIELD

Embodiments of the present invention relate to multi-user multiple input multiple output (MU-MIMO) systems, and more specifically, to receivers implemented in MU-MIMO systems.

BACKGROUND

Unless otherwise indicated herein, the approaches described in this section are not prior art to the claims in this disclosure and are not admitted to be prior art by inclusion in this section.

In a downlink multi-user multiple input multiple output (MU-MIMO) system, a communication node (e.g., a base station) serves one or more user equipments (e.g., other communication nodes, mobile stations, and/or the like) simultaneously through appropriate spatial multiplexing. Thus, in a MU-MIMO system, the base station simultaneously transmits communication signals to one or more user equipments (UEs).

FIG. 1 schematically illustrates a communication system 100. The communication system 100, which is a MU-MIMO communication system, includes a communication node 104 that wirelessly communicates with a plurality of UEs 120, 130, 140 and 160.

The communication node 104 includes a plurality of transmit antennas 106a, . . . , 106d, and a plurality of receive antennas 108a and 108b. The UE 120 includes a plurality of receive antennas 126a and 126b and a transmit antenna 128a. Similarly, the UE 130 includes a plurality of receive antennas 136a and 136b and a transmit antenna 138a, the UE 140 includes a plurality of receive antennas 146a and 146b and a transmit antenna 148a, and the UE 160 includes a plurality of receive antennas 166a and 166b and a transmit antenna 168a.

Prior to transmitting data signals, the communication node 104 usually transmits pilot or control signals to the UEs 120, . . . , 160 through one or more of the plurality of transmit antennas 106a, . . . , 106d. Based at least in part on signals (e.g., pilot signals) received from the communication node 104, each individual UE 120, 130, 140, and/or 160 estimates a condition of the wireless channels between the communication node 104 and the UE. For example, UE 120 estimates a channel matrix $H_{120}$, which is representative of quality of a wireless communication channel between the communication node 104 and the UE 120. Similarly, UEs 130, 140 and 160 estimate respective channel matrices $H_{130}$, $H_{140}$, and $H_{160}$ that are representative of quality of respective wireless communication channels.

In the communication system 100, the communication node 104 and/or one or more of the UEs 120, . . . , 160 generally store a common codebook C. Thus, the codebook C is a shared codebook, which is shared between the communication node 104 and/or one or more of the UEs 120, . . . , 160. The codebook C includes a plurality of candidate precoding matrices $c_1, \ldots, c_N$. That is, $C=\{c_1, \ldots, c_N\}$.

Based at least in part on the respective estimated channel matrices $H_{120}, \ldots, H_{160}$, each of the UEs 120, . . . , 160 select a respective precoding matrix from the plurality of candidate precoding matrices stored in the codebook C. For example, UE 120 may select precoding matrix $c_2$, UE 130 may select precoding matrix $c_4$, and so on.

Selection of the precoding matrix at an UE is based at least in part on the associated estimated channel matrix. For example, a precoding matrix $u_1$ is selected at UE 120 such that:

$$u_1 = \underset{c_j \in C}{\operatorname{argmax}} \|(H_{120})(c_j)\|^2. \qquad \text{Equation (1)}$$

As discussed later with respect to Equation 4, in a case where $c_j$ is the selected precoding matrix, then $(H_{120})(c_j)$ is representative of a signal power component in the data signal received by the UE 120 from the communication node 104. Thus, in Equation 1, out of the N number of candidate precoding matrices $c_1, \ldots, c_N$ included in the codebook C, the selected precoding matrix $u_1$ at UE 120 is a precoding matrix that is associated with a relatively high (e.g., maximum) signal power component in data signal received by the UE 120 from the communication node 104.

Similarly, UE 130, UE 140 and UE 160 select precoding matrices $u_2$, $u_3$ and $u_4$, respectively, from the codebook C based at least in part on respective channel matrices $H_{130}$, $H_{140}$, and $H_{160}$. For example, as previously discussed, UE 120 may select precoding matrix $c_2$ (i.e., $u_2=c_2$), UE 130 may select precoding matrix $c_4$ (i.e., $u_3=c_4$), and so on.

Each of the UEs 120, . . . , 160 then transmits an index of the respective selected precoding matrix to the communication node 104. This index is also referred to as precoding matrix index (PMI), as this index is representative of the associated selected precoding matrix. That is, each of the UEs 120, . . . , 160 feeds back respective PMIs to the communication node 104. For example, if UE 120 selects precoding matrix $c_2$ (i.e., if $u_1=c_2$), then UE 120 feeds back (e.g., through transmit antenna 128a) the PMI corresponding to precoding matrix $c_2$.

The communication node 104 receives (e.g., through one or more of the receive antennas 108a and 108b) the selected PMIs from each of the UEs 120, . . . , 140, and looks up the associated precoding matrices from common codebook C (stored in the communication node 104) using PMIs received from the UEs 120, . . . , 160. The communication node 104 utilizes the looked up precoding matrices for beamforming, while transmitting subsequent signals to the UEs.

As the communication system 100 is a MU-MIMO system, the communication node 104 may serve more than one UE simultaneously through spatial multiplexing. In an example, the communication node 104 transmits signal to UE 120 and UE 130 simultaneously through spatial multiplexing. This may be the case when, for example, the selected precoding matrices $u_1$ and $u_2$ of UE 120 and 130, respectively, are orthogonal to each other. In such a case, signal transmitted by the communication node 104 to the UEs 120 and 130 is given by:

$$x=(u_1)(x_1)+(u_2)(x_2), \qquad \text{Equation (2),}$$

where $x_1$ and $x_2$ are modulated symbols intended for UEs 120 and 130, respectively, and $u_1$ and $u_2$ are the precoding matrices for UE 120 and UE 130, respectively.

The signal received by, for example, UE 120 (e.g., by the receive antennas 126a and 126b of UE 120) is given by:

$$y_{120} = (H_{120})x + n, \quad \text{Equation (3)},$$

where n is the white noise at the receive antennas 126a and/or 126b of UE 120, and x is the signal transmitted by the communication node 104 (e.g., see Equation 2). The signal $y_{120}$ received by UE 120 may be further simplified as:

$$y_{120} = (H_{120})(u_1)(x_1) + \underbrace{(H_{120})(u_2)}_{\text{unknown interference direction}} (x_2) + n, \quad \text{Equation (4)}$$

Symbol $x_1$ is intended for UE 120 and symbol $x_2$ is intended for UE 130. Accordingly, the term $(H_{120})(u_1)(x_1)$ is the signal component in the data signal received by the UE 120, and the term $(H_{120})(u_2)(x_2)$ is the interference component in the data signal received by the UE 120.

The UE 120 previously selected the precoding matrix $u_1$ and transmitted the PMI associated with precoding matrix $u_1$ to the communication node 104. Accordingly, the UE 120 knows the precoding matrix $u_1$ (e.g., has the precoding matrix $u_1$ stored in the UE 120), and hence, the term $((H_{120})(u_1))$ is known to the UE 120. That is, a signal direction (associated with $(H_{120})(u_1)$) of data signal $y_{120}$ is known to UE 120.

However, the UE 120 is not aware of the precoding matrix $u_2$ (or the PMI associated with the precoding matrix $u_2$), as the PMI associated with the precoding matrix $u_2$ was transmitted by UE 130 (but not by UE 120) to the communication node 104. Accordingly, an interference direction (associated with $(H_{120})(u_2)$) of the data signal $y_{120}$ is unknown to the UE 120.

For purposes of this disclosure and unless otherwise mentioned, a precoding matrix and an associated PMI corresponding to a signal direction of a UE are referred to herein as "signal precoding matrix" and "signal PMI," respectively, for the UE. For example, the precoding matrix $u_1$ is associated with signal direction for the UE 120. Accordingly, for the UE 120, the precoding matrix $u_1$ is referred to herein as signal precoding matrix, and the associated PMI is referred to herein as signal PMI.

For purposes of this disclosure and unless otherwise mentioned, a precoding matrix and an associated PMI corresponding to an interference direction of a UE are referred to herein as "interference precoding matrix" and "interference PMI," respectively, for the UE. For example, the precoding matrix $u_2$ is associated with interference direction for the UE 120. Accordingly, for the UE 120, the precoding matrix $u_2$ is referred to herein as interference precoding matrix, and the associated PMI is referred to herein as interference PMI. Also, the interference precoding matrix of one UE is the signal precoding matrix of another UE. For example, the interference precoding matrix $u_2$ of UE 120 is the signal precoding matrix of UE 130.

Referring again to Equation 4, the UE 120 knows the respective signal precoding matrix, the signal PMI, and the signal direction of data signal received by the UE 120. However, the UE 120 is unaware of UE 120's interference precoding matrix, interference PMI, and the interference direction.

As the interference direction is unknown to UE 120, the UE 120 in the conventional communication system 100 of FIG. 1 ignores the interference and performs, for example, maximum ratio combining (MRC) for data detection, which is limited at high signal-to-noise ratio (SNR). Various systems have overcome this by feeding forward, to the UE 120, the interference information (e.g., interference PMI) so that minimal mean square error (MMSE) receive combining is used instead of MRC. However, this increases the overhead and may not be feasible with higher order systems where the number of interfering streams may be more than one.

SUMMARY

In various embodiments, the present disclosure provides a method within a wireless communication network, the method comprising, receiving by a user equipment (UE), a signal and interference component, wherein the interference component was transmitted in an unknown direction; and decoding, by the UE, the signal based at least in part on the interference component. The method further comprise, determining, by the UE, a plurality of possible interference directions for the interference component based at least in part on a preferred matrix index of the UE.

In one embodiment, said decoding comprises (i) assigning a first interference direction of the plurality of possible interference directions to the unknown interference direction, (ii) decoding the signal based at least in part on the interference component. Said decoding may further comprise (i) assigning a second interference direction of the plurality of interference directions to the unknown interference directions and (ii) decoding the signal based at least in part on the interference component.

In one embodiment, the method further comprises determining, by the UE, an estimated interference direction based on the plurality of possible interference directions, wherein the estimated interference direction is an average of the plurality of possible interference directions or a weighted average of the plurality of possible interference directions; and wherein said decoding comprises assigning the estimated interference direction to the unknown interference direction and decoding based at least in part on the interference component.

In one embodiment, the method further comprises determining, by the UE, a plurality of probabilities for decoding the signal based on the interference component, wherein the interference component includes a complex symbol having one of a plurality of interference constellations; and wherein said decoding comprises decoding the signal with the highest probability.

In another embodiment, said decoding comprises canceling the interference component by projecting the signal and the interference component orthogonal to a plurality of receive spaces.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

DETAILED DESCRIPTION

Figure 1:
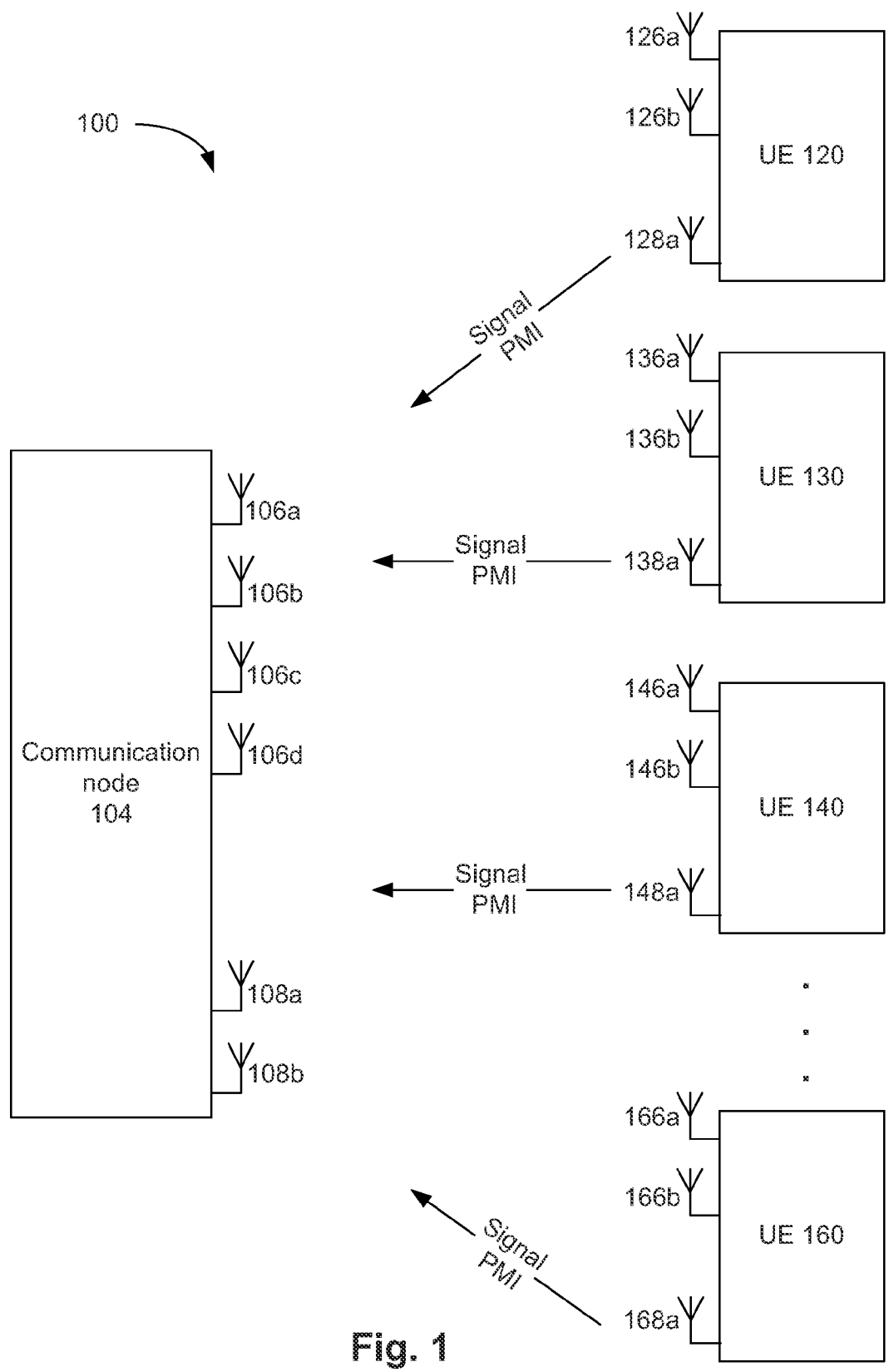
FIG. 1 schematically illustrates a communication system.

In the following detailed description, reference is made to the accompanying drawings which form a part hereof wherein like numerals designate like parts throughout, and in which is shown by way of illustration embodiments in which the invention may be practiced. Other embodiments may be utilized and structural or logical changes may be made without departing from the scope of the present invention. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), 3rd Generation Partnership Project (3GPP) long-term evolution (LTE) project, ultra mobile broadband (UMB) project (also referred to as "3GPP2"), wireless access networks that employ multi-cell environment (e.g., wireless networks that employ a Coordinated Multi-Point transmission/reception (CoMP) feature in LTE-Advanced downlink/uplink (DL/UL) MIMO systems (also referred as LTE-A)), and/or the like. In other embodiments, communications may be compatible with additional/alternative communication standards and/or specifications.

In various embodiments, a UE may determine, estimate, or otherwise account for interference from spatially separated UEs and employ MMSE receive combining. MMSE receive combining may be utilized by one or more of the spatially separated UEs without receiving the interfering directions or interference PMIs of the other UEs. This may enable improved UE performance, which may also be exploited to improve the overall network performance once link adaptation takes the former into account. While the present disclosure is discussed with reference to a single interfering UE that is present with the same precoding vector over all time-frequency bins, and where the noise term is spatially white, it is not so limited. Those of ordinary skill in the art will readily understand that the present disclosure is applicable to various other situations.

Figure 2:
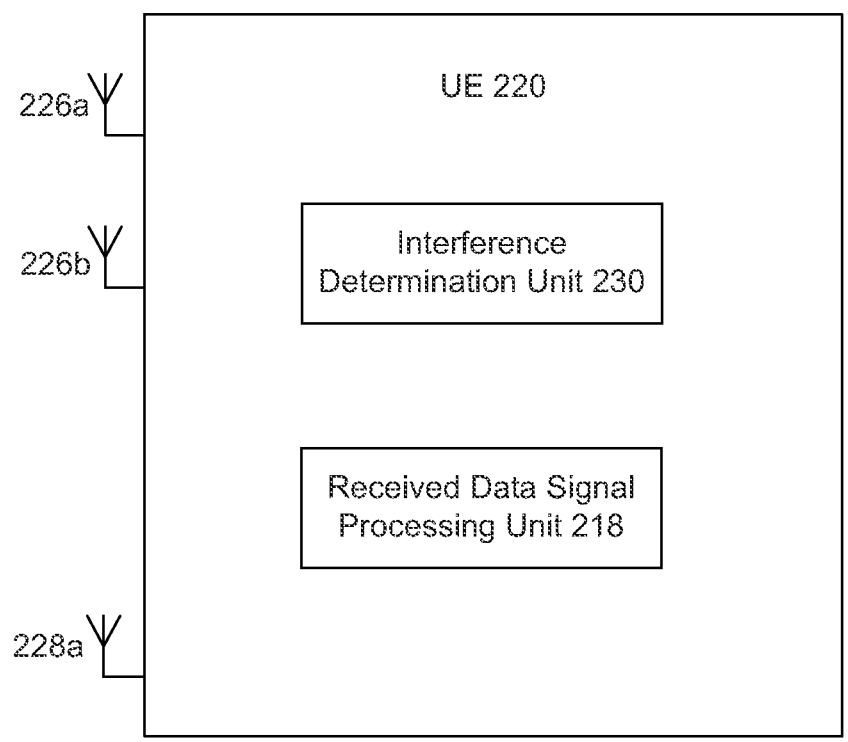
FIG. 2 schematically illustrates a UE in accordance with various embodiments of the present disclosure.

Referring to FIG. 2, a UE 220 is illustrated in accordance with various embodiments. The UE 220 includes a plurality of receive antennas 226a and 226b and one or more transmit antennas 228a. In addition, the UE 220 includes a received data signal processing unit 218 and an interference determination unit 230. In various embodiments, one or more of these units may be combined to form a single unit, and/or one or more components of at least some of these units may be common or shared.

In various embodiments, the interference determination unit 230 is configured to estimate a direction of the interference component within a received signal, determine a direction of the interference component within a received signal, determine various probabilities of decoding a signal based on the interference component, and/or perform various algorithms to cancel interference. For example, and as will be discussed further herein, the interference determination unit 230 can perform one or more methods that effectively estimate, determine, or otherwise account for an interfering component of a received signal, and consequently, enable use of minimal mean square error (MMSE) receive combining.

In various embodiments, the received signal data processing unit 218 includes one or more components such as a decoder. The received signal data processing unit 218 is coupled to one or more antennas and configured to decode the received signal based at least in part on the interference component. For example, an unknown interference direction of the interference component can be estimated or acquired. Based on the estimated or acquired interference direction, the received signal data processing unit 218 decodes the signal using MMSE receive combining.

Figure 3:
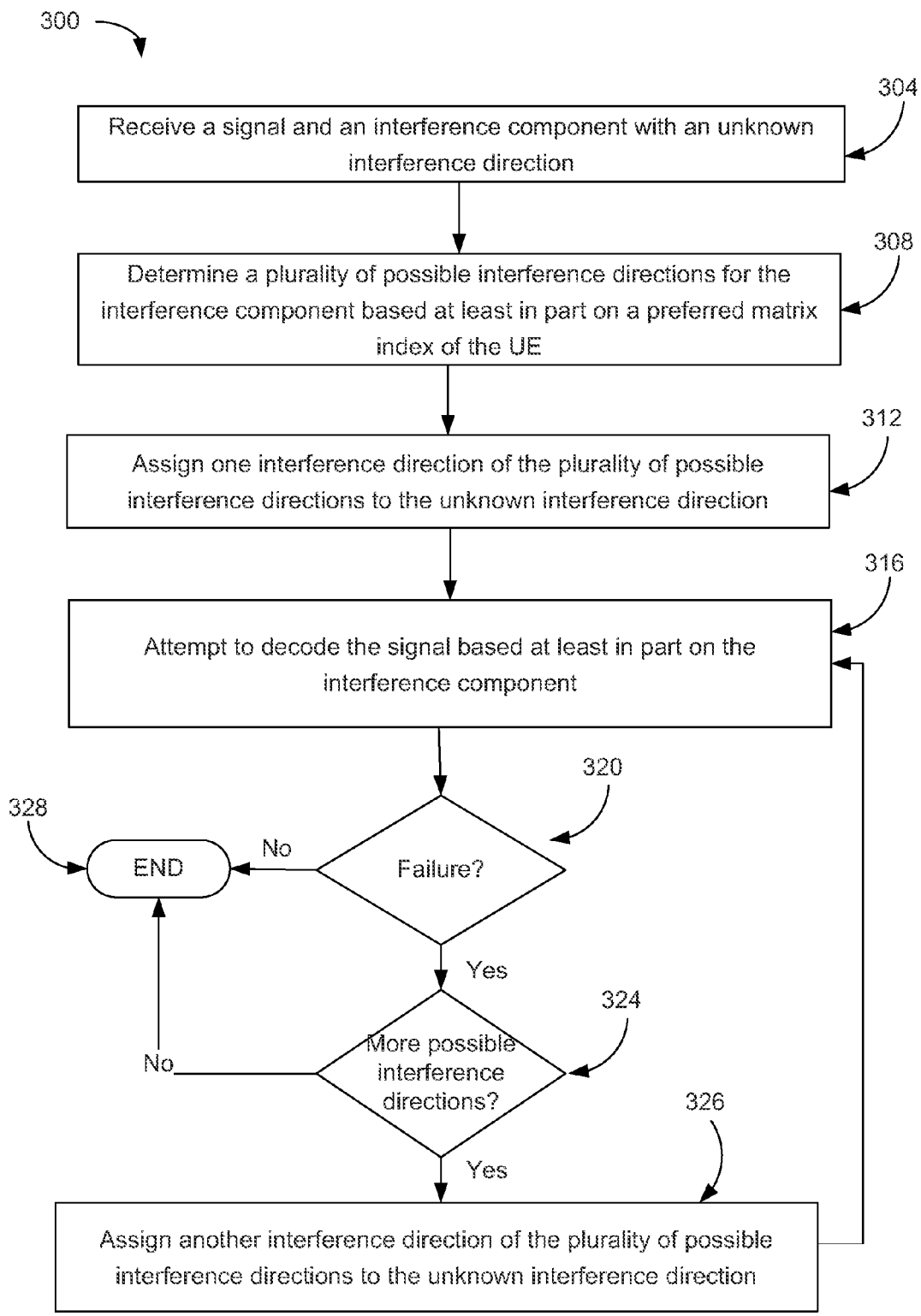
FIG. 3 illustrates a method for decoding a signal including acquiring an interference PMI in accordance with various embodiments.

FIG. 3 illustrates a method 300 for decoding a signal by acquiring an unknown interference PMI or interference direction, in accordance with various embodiments. As stated previously, in a MU-MIMO system, the communication node typically transmits simultaneously to spatially distinct UEs. Therefore, for each received signal there is a set number of possible interference directions. A UE may determine the proper interference direction from this set by attempting to decode the packet for each possible interference scenario. Consequently, the UE may employ MMSE receive combining without being handed the interference PMI of the interfering UEs. This is illustrated in more detail with respect to FIG. 3.

In FIG. 3, the UE 220 receives a signal and interference component with an unknown interference direction at 304. In other words, the UE 220, may not have been signaled the PMIs of the interfering UEs from the communication node. At 308, the interference determination unit 230 determines a plurality of possible interference directions for the interference component. This determination can be done in a number of manners, for example, the interference determination unit 230 may determine the possible interference directions based at least in part on the PMI of the UE 220. Because the UE 220 is aware of its own PMI, the UE 220 can determine the complete set of possible interference directions.

At 312, the interference determination unit 230 assigns one interference direction of the plurality of possible interference directions to the unknown interference direction of the interference component. The received signal data processing unit 230 then attempts to decode the signal based at least in part on the interference component with the assigned interference direction at 316. If the UE 220 is able to decode the signal using MMSE receive combining at 320, the method ends at 328 and await the next packet. If, however, the UE 220 is unable to decode the packet at 320, the UE 220 determines if there are more possible interference directions from the set of previously determined possible interference directions 324.

If all of the possible interference directions have been exhausted, the method ends at 328. Following block 328, the UE 220 requests retransmission of the packet from the communication node, or alternatively wait for the next packet. Returning to 324, if more possible interference directions are available, the interference determination unit 218 assigns another interference direction of the plurality of possible interference directions to the unknown interference direction at 326, and again attempts to decode the signal based at least in part on the interference component at 316. The method continues until all possible interference directions have been attempted. This may include the scenario where no interference is included.

As an example, consider a 4×2 MU-MIMO communication system with a maximum of two scheduled users per slot. If the UE under consideration, e.g., UE 220, is using precoding matrix $c_1$, the possible set of interfering PMI are i={0, $c_2$, $c_3$, $c_4$}. Consequently, the UE 220 can, for each possible interfering PMI, utilize MMSE receive combining. If the packet is decoded, the algorithm stops. If the packet is not decoded and all possible PMIs have been attempted, the UE 220 may request a retransmission.

Figure 4:
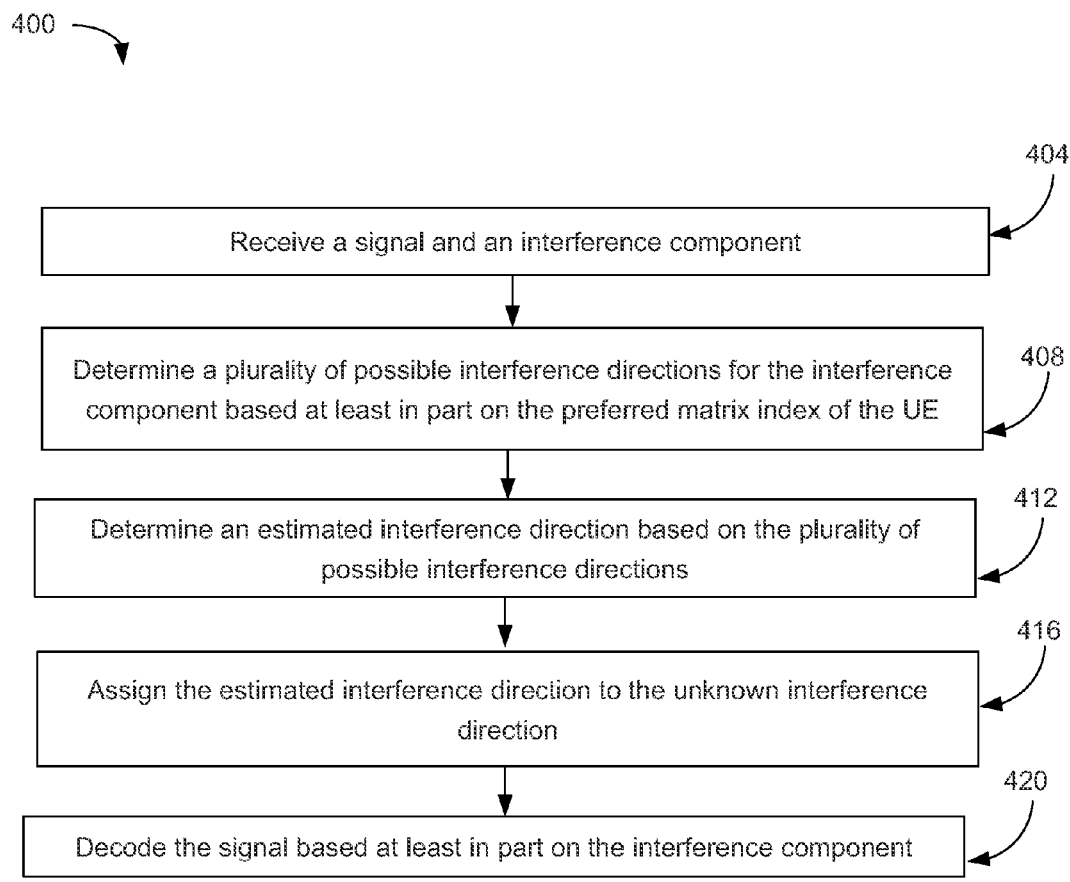
FIG. 4 illustrates a method of decoding a signal including estimating an interference PMI in accordance with various embodiments of the present disclosure

Referring to FIG. 4, a method of decoding a signal including estimating an interference PMI or interference direction is illustrated in accordance with various embodiments. As mentioned previously, a UE 220 has knowledge of its own PMI. Consequently, the UE 220 may also determine the various possible interference directions for another signal transmitted simultaneously to another UE. In one embodiment, the interference determination unit 218 of UE 220 averages the various possible interference directions. This average is done without any knowledge of the received signals. Rather, the average can be simply an average of all possible interference directions.

Alternatively, the interference determination unit 218 determines one or more probabilities for the various interference directions based on the received signals. With all the possible interference directions given a probability, the interference determination unit 218 of UE 220 performs a weighted average of the possible interference directions. The weighted average can then be utilized by the received signal data processing unit 230 to decode the signal.

This method is more clearly illustrated with reference to the flow chart of FIG. 4. At 404, the UE 220 receives a signal and an interference component. The interference determination unit 218 of UE 220 determines a plurality of possible interference directions for the interference component at 408. This determination may be accomplished in a number of manners including, for example, algorithms based on the PMI of the UE 220. As described previously, the UE 220 having knowledge of its PMI may determine the possible interference directions of the spatially separated interfering UEs.

Having determined the set of possible interference PMIs or interference directions, the UE 220 determines an estimated interference direction based on the plurality of possible interference directions at 412. As explained earlier, this may include averaging the plurality of possible interference directions to arrive at an estimated interference direction, or alternatively, performing a weighted average of the possible interference directions.

As an example of averaging the possible interference directions without determining probabilities for the various possible directions, the MMSE receive combining can be calculated as:

$$v = \left(\frac{1}{3}(Hc_2c_2^\dagger H^\dagger + Hc_3c_3^\dagger H^\dagger + Hc_4c_4^\dagger H^\dagger) + N_0I\right)^{-1} Hc_1 \quad \text{Equation (5)}$$

where H is the 2×4 channel and $N_0$ is the noise variance, which may be spatially white. The case where there is no co-scheduled user can also be considered in calculating the interference covariance matrix.

In performing the weighted average, in accordance with an embodiment, the interference determination unit 218 assigns the probabilities of each interference direction based on the received signals. For example, if $p_i = Pr(u_2 = c_i|r)$ is the probability that the interference PMI or interference direction is i conditioned on the received samples, the MMSE combiner can be obtained in accordance with the following:

$$v = \left(\sum_{i=2}^{4} p_i Hc_ic_i^\dagger H^\dagger + N_0I\right)^{-1} Hc_1. \quad \text{Equation (6)}$$

Returning to FIG. 4, the interference determination unit 218 assigns the estimated interference direction to the unknown interference direction for signal processing at 416. In various embodiments this includes assigning the average or the weighted average. At 420, the received signal data processing unit 230 decodes the signal based on the interference component, using for example MMSE receive combining.

Figure 5:
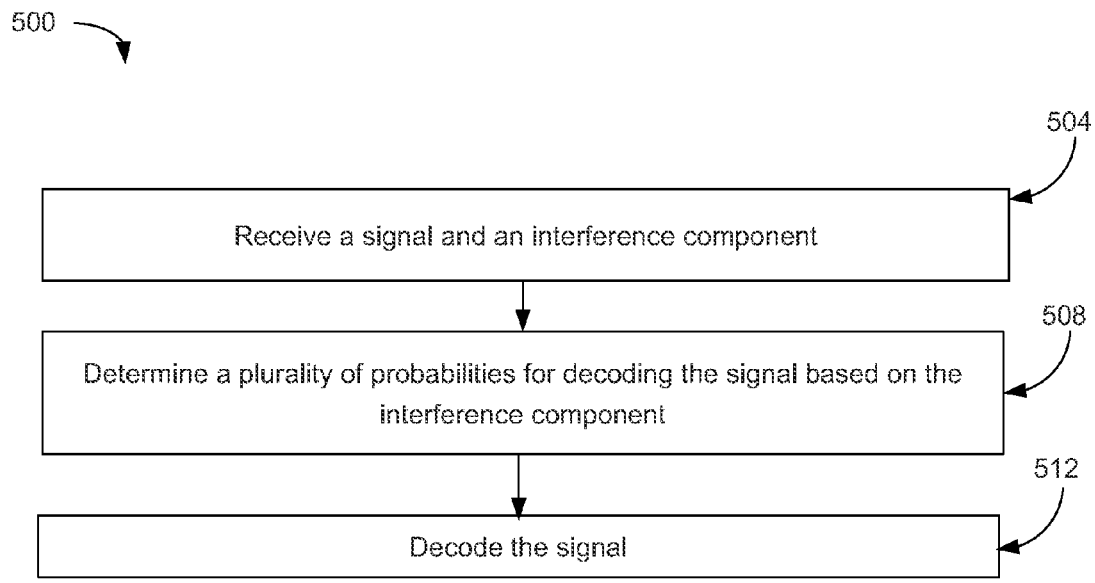
FIG. 5 illustrates a method of decoding a signal including accounting for an interference PMI and interference signal in accordance with various embodiments of the present disclosure.

Referring to FIG. 5, a method of decoding a signal including accounting for an interference PMI and interference signal is illustrated, in accordance with various embodiments. As discussed with reference to FIGS. 3 and 4, the UE 220 attempts to determine or estimate an interference PMI or interference direction of an interference component. In FIG. 5, the interference determination unit 218 may also take into account the symbol transmitted to the interfering UE along the interference direction. For example, the interference determination unit 218 may account for all directions and constellations of the symbol $S_s$. These constellations include, but are not limited to QPSK, 16 QAM, and 64 QAM. The interference determination unit 218 attempts to determine the maximum likelihood of decoding for all possibilities.

With reference to FIG. 5, the UE receives a signal and an interference component at 504. The interference component includes a complex symbol that was transmitted to a spatially distinct UE in accordance with a MU-MIMO communication system. A symbol may be a signal that represents transmitted data. Based on the received signal and the interference component, the UE determines a plurality of probabilities for decoding the signal based on the interference component. This may take into account all possible directions and constellations of the interference component. While the determination will be discussed below with respect to various algorithms, other algorithms and optimizations may be utilized without deviating from the scope of the present disclosure.

As discussed previously, assuming the channel is slowly varying, a UE 220 can determine the statistics of the interference from the received samples and find an interference scenario that most closely matches the empirical data. Consider the received samples of a UE k, in a certain frequency bin of a time period T, represented by the following equation with $u_j$ fixed over the relevant observation period that corresponds to one subframe in LTE, e.g., 1 millisecond.

$$y_k(t) = H_k(t)\sum_{j=1}^{K} u_j x_j(t) + n_k(t), t = 1, 2, \ldots, T \quad \text{Equation (7)}$$

Assuming $n_k(t) \sim CN(0, N_0 I)$ is a circular symmetric Gaussian random vector, the probability density of the received vector $y_k(t)$ conditioned on the interference precoding vector can be written as:

$$Pr(y_k(t); u_1 \ldots u_K) = \sum_{s_1 \in \Omega_1} \ldots \sum_{s_K \in \Omega_K} \quad \text{Equation (8)}$$

$$Pr(y_k(t) | x_1(t) = s_1(t), \ldots ,$$

$$x_K(t) = s_K(t); u_1, \ldots, u_K) \times$$

$$\prod_{i=1}^{K} Pr(x_i(t) = s_i(t))$$

$$= (\pi N_0)^{-N} \sum_{s_1 \in \Omega_1} \sum_{s_K \in \Omega_K} \prod_{i=1}^{K}$$

$$Pr(x_i(t) = s_i(t)) \exp$$

$$\left( \frac{-1}{N_0} \left\| y_k(t) - H_k(t) \sum_{j=1}^{K} u_j s_j(t) \right\|^2 \right)$$

where $\Omega_i$ denotes the symbol constellation of user i and $Pr(x_i(t)=s_i)$ denotes the a-priori probability of $x_i(t)=s_i \in \Omega_i$. This assumes that the user symbols are statistically independent, which is typically the case. Now denote by $Y_k$ the observed data over the entire time window $t=1, \ldots, T$, $Y_k = [y_k(1), \ldots y_k(T)]$ and assuming that $n_k(t)$ and $x_i(t)$ to be independent and identically distributed across time t, the following equation may be obtained:

$$\log[Pr(Y_k; u_1, \ldots, u_K)] = \quad \text{Equation (9)}$$

$$-NT\log[\pi N_0] + \sum_{t=1}^{T} \log \left[ \sum_{s_1 \in \Omega_1} \ldots \sum_{s_K \in \Omega_K} \prod_{i=1}^{K} Pr(x_i(t) = s_i) \right.$$

$$\left. \exp\left( \frac{-1}{N_0} \left\| y_k(t) - H_k(t) \sum_{j=1}^{K} u_j s_j(t) \right\|^2 \right) \right]$$

The maximum likelihood estimation of $U_j(j \neq k)$ amounts to finding the $u_j$s that maximizes equation (9). With the maximum likelihood estimation, the decoder may decode the signal at 512.

In various embodiments, alternatives or optimizations may be utilized to decrease the complexity of associated with the maximum likelihood estimation discussed above. For example, it is noted that in high SNR conditions only the true symbols will contribute non-negligible terms to the exponent summations inside the log function of equation (9). Denoting $\tilde{s}_i(t)$ the constellation value of $x_i(t)$, the maximum likelihood estimate in high SNR reduces to finding the $u_j$s that satisfy the following equation:

$$\{u_j\} = \quad \text{Equation (10)}$$

$$\arg\max_{\{u_j\} \in \mathcal{I}} \sum_{t=1}^{T} \log\left[ \exp\left( -\frac{1}{N_0} \left\| y_k(t) - H_k(t) \sum_{j=1}^{K} u_j \tilde{s}_j(t) \right\|^2 \right) \right]$$

where $\mathcal{I}$ denotes the set containing possible values of $\{u_j\}$, where no two entries are the same, with the exception of zero vectors, and with the value of $u_k$ fixed. The possible set also allows interfering PVIs to be zero vectors to represent the case of no interference. Equation 10, in various embodiments, is also equivalent to finding the $u_j$s that collectively minimizes the following least square problem.

$$\{u_j\} = \arg\min_{\{u_j\} \in \mathcal{I}} \sum_{t=1}^{T} \left\| y_k(t) - H_k(t) \sum_{j=1}^{K} u_j \tilde{s}_j(t) \right\|^2 \quad \text{Equation (11)}$$

In various embodiments, it is reasonable to assume that the channel is fixed over the observation window. For example, in low Doppler scenarios, Equation 11 can be further simplified by replacing $H_k(t)$ by $H_k$, which is often replaced by its estimator $\hat{H}$.

In other embodiments, while some of the transmitted symbols may be known at the receiver, for example pilot signals, most of the transmitted symbols are unknown and therefore cannot be used in equation 11. A further approximation of the maximum likelihood estimate could be to replace the $\tilde{s}_i(t)$ by some estimate $\hat{s}_i(t)$. The term $\hat{s}_i(t)$ may be generated in a number of ways. In one embodiment, the UE may apply the MMSE receiver of equation 5 to generate $\hat{s}_i(t)$. In another embodiment, the MMSE receiver of equation 6 may be used to generate $\hat{s}_i(t)$. In another embodiment, equation 10 may be used to generate $\hat{s}_i(t)$. Other algorithms may also be used without deviating from the scope of this disclosure.

Simplifying equation 11 with the above observations results in the following equation:

$$\{u_j\} = \arg\min_{\{u_j\} \in \mathcal{I}} \sum_{t=1}^{T} \| y_k(t) - V_k(t)\hat{s} \|^2. \quad \text{Equation (12)}$$

and for a given $u_1, \ldots, u_k, \hat{s}(t)$ can be obtained from the least squares solution:

$$\hat{s}(t) = \text{Slice}[(V_k^\dagger(t) V_k(t))^{-1} V_k^\dagger(t) y_k(t)] \quad \text{Equation (13)}$$

Consequently, the maximum likelihood procedures now amount to trying all possible combinations $u_j$s ($j \neq k$), solving for the unknown symbols using equation (13) and finding the set of $u_j$s that minimizes equation (12). In various embodiments, equation (13) may be a zero-forcing equalizer that can often be replaced by an MMSE equalizer whose complexity is similar but provides more accurate and robust estimates.

The algorithms noted above for determining the maximum likelihood of decoding across the various possibilities of the interference component can also be adapted to suit different scenarios. For example, in one embodiment, it was assumed that $u_k$ was known at the receiver end via signaling. Consequently, the knowledge of $u_k$ was assumed in all the maximum likelihood equations and was not part of the optimization process. For a case where $u_k$ is unknown, the maximum likelihood derivation may include $u_k$ in the optimization process.

In another embodiment, it was assumed that $y_k$ was the received signal vector for a certain frequency bin. This assumption may be expanded to the scenario where the precoding is fixed over several bins, for example 12 bins or more in LTE), by augmenting $y_k(t)$ to include all the frequency bins over which the precoding vector is known to be fixed, the UE may extend the number of users to $KN_{bins}$ and perform various maximization steps when constraining the $U_j$s to be fixed over the appropriate number of $N_{bins}$ "virtual" users.

In another embodiment, the constellations of the ith user is unknown to the receiver, for example in LTE Rel. 8, the other user signal may be QPSK, 16 QAM, or 64 QAM. In such an embodiment, the UE may define $\Omega_i$ as the union of all possible constellations.

In another embodiment, the UE may estimate an interference covariance matrix from the received samples and use it directly for MMSE receive combining for data demodulation. For the signal model of Equation (7), the sample covariance of the received signal can be calculated as $$\hat{R}_k = \frac{\sum_{t=1}^{T} y_k(t) y_k^\dagger(t)}{T} \qquad \text{Equation (14)}$$

Then the estimate of the interference covariance can be obtained as:

$$\hat{Q}_k = \hat{R}_k - N_0 I - H_k u_k u_k^\dagger H_k^\dagger P_k \qquad \text{Equation (15)}$$

where $P_k$ is the average transmit power for UE k. This covariance matrix can be directly used to obtain the MMSE receive combiner as follows:

$$v_k = (\hat{Q}_k + N_0 I)^{-1} H u_k \qquad \text{Equation (16)}$$

The interference covariance matrix corresponding to each of the interference scenarios $\mathfrak{J}$ can also be determined and the most likely scenario selected by comparing it to the empirical covariance matrix $\hat{Q}_k$. Mean squared error is one of the metrics that can be used for the comparison.

$$\{\hat{u}_j\} = \arg\min_{\{u_j\} \in \mathfrak{J}} \|\hat{Q}_k - Q[\{u_j\}]\|_F \qquad \text{Equation (17)}$$

where $Q[\{u_j\}]$ represents the covariance matrix corresponding to the scenario $\{u_j\}$ and $\|*\|_F$ represents the frobenius norm.

In general, the UE can consider iterative algorithms in which the constellation symbols are first estimated and the estimated symbols are then used to estimate the interfering precoding vectors. For example, let $\hat{x}_{i(t)}$ be the estimate for the symbols. Then assuming the received signal follows the following model $$y_k(t) = H_k \sum_{j=1}^{K} u_j \hat{x}_j(t) + n_k(t), \qquad \text{Equation (18)}$$

$$t = 1, 2, \ldots, T$$

The estimates for $u_j$s can be determined. Assuming the estimates for the interfering PVIs to be perfect, new symbol estimates are obtained. The iteration can continue for a certain number of times or when there is convergence. For the case of K=2, the UE can obtain closed form solutions for the maximum likelihood estimate of the interfering direction based on the estimates of the user symbols. The interference direction at UE 1 for the case of K=2 can be obtained as $$\hat{u}_2 = H_1^{-1} \frac{\sum_{t=1}^{T} \hat{x}_2^*(t)(y_1(t) - H_1 u_1 \hat{x}_1(t))}{\sum_{t=1}^{T} |\hat{x}_2(t)|^2}. \qquad \text{Equation (19)}$$

Making a determination on the above estimate to the closest feasible interfering vector typically leads to the maximum likelihood estimate. For the scenario considered in Equation (18), an estimate of the interference covariance can also be obtained directly as:

$$\hat{Q}_1 = \frac{\sum_{t=1}^{T} (y_1(t) - H_1 u_1 \hat{x}_1(t))(y(t) - H_1 u_1 \hat{x}_1(t))^\dagger - TN_0 I}{\sum_{t=1}^{T} |\hat{x}_2(t)|^2}. \qquad \text{Equation (20)}$$

In scenarios where the approximation $$\frac{1}{T} \sum_{t=1}^{T} |\hat{x}_2|^2 \approx P_2$$

is valid or where the number of samples is large enough to use ergodic mean, the maximum likelihood estimation for $x_1$ is sufficient to obtain the estimate of the interference covariance matrix. Now the interference vector whose covariance closely matches with the above estimate is chose as $u_2$ and is used for MMSE receive combining for symbol demodulation:

$$\hat{u}_2 = \underset{c_i \in \mathfrak{V}}{\arg\min} \|\hat{Q}_1 - H_1 c_i c_i^\dagger H_1^\dagger\|_F \qquad \text{Equation (21)}$$

Figure 6:
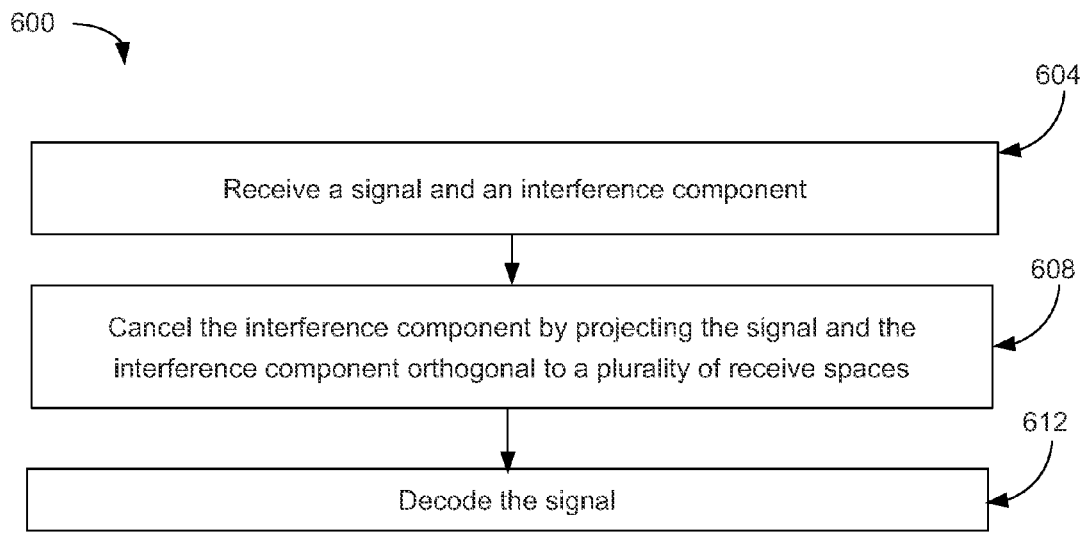
FIG. 6 illustrates another method of decoding a signal in accordance with various embodiments of the present disclosure.

Referring now to FIG. 6, another method of decoding a signal is illustrated, in accordance with various embodiments. When the total number of transmitted streams in a communication system is less than the number of receiver antennas at the UE, the UE cancels the interference by projecting the signal and the interference components orthogonal to a plurality of receive spaces. The projection that gives zero energy, or in a noisy case, the minimum energy, corresponds to the actual transmission scenario.

Referring to the flow chart, at 604, a UE receives a signal and an interference component. The UE cancels the interference component at 608 by projecting the signal and the interference component orthogonal to a plurality of receive spaces and determine which projection gives the least energy.

As an example, consider a case with two users with one stream per user. In a noiseless case, the dimensionality of the received signal (signal plus the interference component) is only 2. If the receiver has three or more antennas, the UE is capable of projecting the received signal orthogonal to the receive space corresponding to $Hc_1$ and $Hc_2$, i=2, 3, 4. The projection will yield zero energy only if $u_2 = c_i$. With the transmission scenario known by the UE, it may decode the signal at 612.

Figure 7:
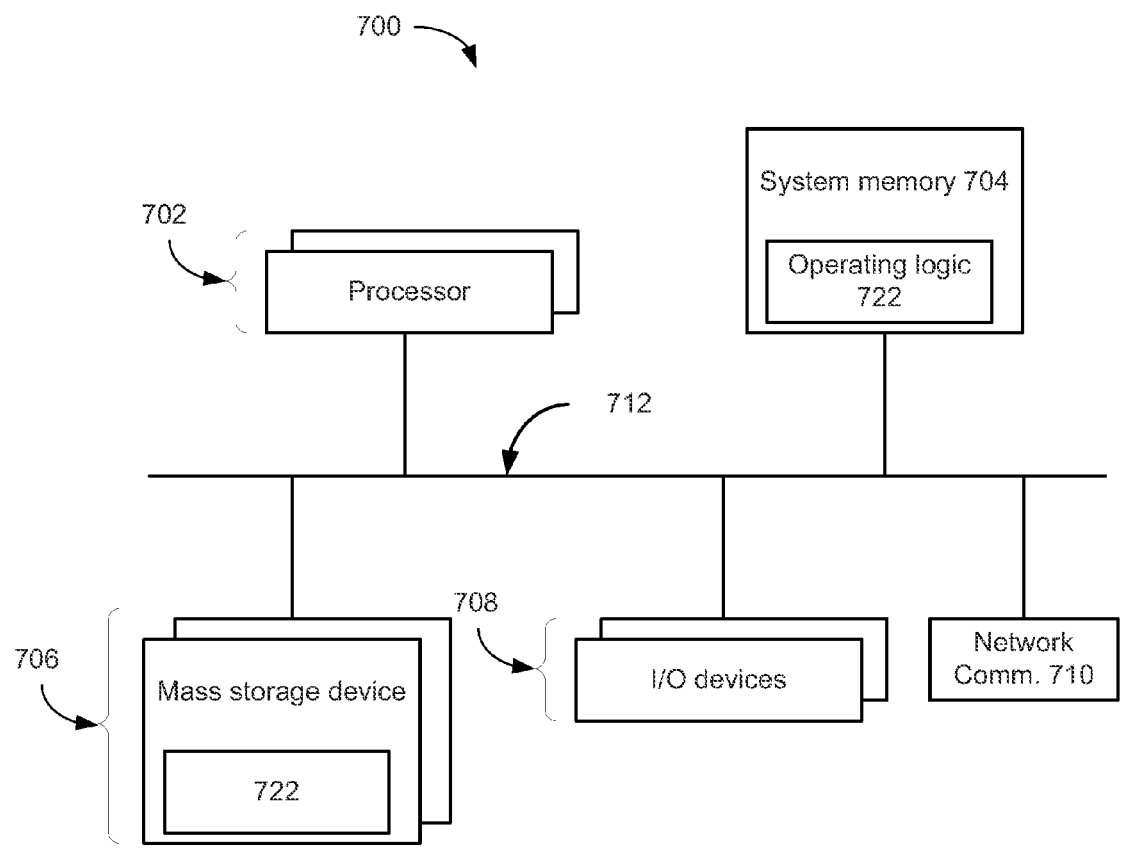
FIG. 7 is a block diagram of an illustrative system suitable for practicing the embodiments of the present disclosure.

FIG. 7 is a block diagram of an illustrative system 700 suitable for practicing the embodiments of the present disclosure. As illustrated, system 700 includes one or more processors or processor cores 702, and system memory 704. For the purpose of this application, including the claims, the terms "processor" and "processor cores" may be considered synonymous, unless the context clearly requires otherwise. Additionally, system 700 includes mass storage devices 706 (such as diskette, hard drive, compact disc read only memory (CDROM) and so forth), input/output devices 708 (such as a display to render visual manifestation, a keyboard, a cursor control, and so forth) and communication interfaces 710 (such as network interface cards, modems and so forth). The elements of FIG. 7 may be coupled to each other via system bus 712, which represents one or more buses. In the case of multiple buses, they may be bridged by one or more bus bridges (not illustrated).

In an embodiment, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C or other suitable high level programming languages.

In an embodiment, a permanent copy of the programming instructions is stored into permanent storage 706 in the factory, or in the field, through, for example, a distribution medium (not shown), such as a compact disc (CD), or through communication interface 710 (from a distribution server (not shown)). That is, one or more distribution media having instructions 722 may be employed to distribute the instructions 722 and program various computing devices.

In various embodiments, the system 700 acts as one of the UEs 220, ..., 260 (e.g., UE 220) of FIG. 1 or 2. In these embodiments, the system 700 includes or is coupled to one or more transmit antennas and/or receive antennas (e.g., transmit antennas 226a, ..., 226d, and/or receive antenna 228a) through which the system 700 communicates (feeds back preferred interference PMI, receives data signal, etc.) with communication node 204.

In embodiments of the present disclosure, an article of manufacture (not illustrated) implements one or more methods as disclosed herein. For example, in various embodiments, an article of manufacture may comprise a storage medium such as a computer-readable medium, and a plurality of programming instructions stored in the storage medium and adapted to program a computing device to perform one or more of the methods disclosed previously.

Although specific embodiments have been illustrated and described herein, a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. This application is intended to cover any adaptations or variations of the embodiment discussed herein. Therefore, it is manifested and intended that the invention be limited only by the claims and the equivalents thereof.

What is claimed is:

1. A method, comprising:
   determining, by a user equipment, a channel matrix that is representative of a channel condition between the user equipment and a communication node;
   selecting, by the user equipment,
   (i) a first precoding matrix from a plurality of precoding matrices known to both the user equipment and the communication node, wherein the first precoding matrix is selected, by the user equipment, based on the channel matrix determined to be representative of the channel condition between the user equipment and the communication node, and wherein each of the plurality of candidate precoding matrices is associated with a corresponding direction, and
   (ii) a precoding matrix index that is representative of the first precoding matrix;
   transmitting, by the user equipment, the precoding matrix index to the communication node;
   receiving, by the user equipment from the communication node, a data signal comprising (i) a signal component and (ii) an interference component, wherein the signal component of the data signal is transmitted in the direction corresponding to the first precoding matrix, and wherein the interference component of the data signal is transmitted in a direction corresponding to a precoding matrix of the plurality of precoding matrices that is different from the first precoding matrix;
   based at least in part on the precoding matrix index representative of the first precoding matrix, determining, by the user equipment, a first plurality of directions correspondingly associated with a first plurality of precoding matrices, the first plurality of precoding matrices being a subset of the plurality of precoding matrices, the first plurality of precoding matrices being different from the first precoding matrix;
   assigning a first direction of the first plurality of directions as the direction of the interference component;
   based on assigning the first direction of the first plurality of directions as the direction of the interference component, attempting to decode the data signal;
   in response to a failure to decode the data signal based on assigning the first direction of the first plurality of directions as the direction of the interference component, assigning a second direction of the first plurality of directions as the direction of the interference component;
   based on assigning the second direction of the first plurality of directions as the direction of the interference component, attempting to decode the data signal; and
   in response to a success in decoding the data signal based on assigning the first direction of the first plurality of directions as the direction of the interference component, refraining from (i) assigning the second direction of the first plurality of directions as the direction of the interference component and (ii) attempting to decode the data signal based on assigning the second direction of the first plurality of directions as the direction of the interference component.

2. An article of manufacture, comprising:
   a non-transitory computer readable medium having computer-readable instructions stored thereon that, if executed by a computing device, configure the computing device to:
   determine a channel matrix that is representative of a channel condition between a user equipment and a communication node;
   select
   (i) a first precoding matrix from a plurality of precoding matrices known to both the user equipment and the communication node, wherein the first precoding matrix is selected, by the user equipment, based on the channel matrix determined to be representative of the channel condition between the user equipment and the communication node, and wherein each of the plurality of candidate precoding matrices is associated with a corresponding direction, and (ii) a precoding matrix index that is representative of the first precoding matrix;

transmit the precoding matrix index to the communication node;

receive a data signal comprising (i) a signal component and (ii) an interference component, wherein the signal component of the data signal is transmitted in the direction corresponding to the first precoding matrix, and wherein the interference component of the data signal is transmitted in a direction corresponding to a precoding matrix of the plurality of precoding matrices that is different from the first precoding matrix;

based at least in part on the precoding matrix index representative of the first precoding matrix, determine a first plurality of directions correspondingly associated with a first plurality of precoding matrices, the first plurality of precoding matrices being a subset of the plurality of precoding matrices, the first plurality of precoding matrices being different from the first precoding matrix;

assign a first direction of the first plurality of directions as the direction of the interference component;

based on assigning the first direction of the first plurality of directions as the direction of the interference component, attempt to decode the data signal;

in response to a failure to decode the data signal based on assigning the first direction of the first plurality of directions as the direction of the interference component, assign a second direction of the first plurality of directions as the direction of the interference component;

based on assigning the second direction of the first plurality of directions as the direction of the interference component, attempt to decode the data signal; and in response to a success in decoding the data signal based on assigning the first direction of the first plurality of directions as the direction of the interference component, refrain from (i) assigning the second direction of the first plurality of directions as the direction of the interference component and (ii) attempting to decode the data signal based on assigning the second direction of the first plurality of directions as the direction of the interference component.

3. A mobile station comprising:

a received signal data processing unit configured to
determine a channel matrix that is representative of a channel condition between the mobile station and a communication node,
select
(i) a first precoding matrix from a plurality of precoding matrices known to both the mobile station and the communication node, wherein the first precoding matrix is selected based on the channel matrix determined to be representative of the channel condition between the mobile station and the communication node, and wherein each of the plurality of candidate precoding matrices is associated with a corresponding direction, and (ii) a precoding matrix index that is representative of the first precoding matrix;

one or more antennas configured to
transmit the precoding matrix index to the communication node;

receive, from the communication node, a data signal comprising (i) a signal component and (ii) an interference component, wherein the signal component of the data signal is transmitted in the direction corresponding to the first precoding matrix, and wherein the interference component of the data signal is transmitted in a direction corresponding to a precoding matrix of the plurality of precoding matrices that is different from the first precoding matrix; and an interference direction selection unit configured to, based at least in part on the precoding matrix index representative of the first precoding matrix, determine a first plurality of directions correspondingly associated with a first plurality of precoding matrices, the first plurality of precoding matrices being a subset of the plurality of precoding matrices, the first plurality of precoding matrices being different from the first precoding matrix, wherein the interference direction selection unit is further configured to assign a first direction of the first plurality of directions as the direction of the interference component;

wherein the received signal data processing unit is further configured to, based on the first direction of the first plurality of directions being assigned as the direction of the interference component, attempt to decode the data signal, wherein the interference direction selection unit is further configured to, in response to a failure to decode the data signal based on assigning the first direction of the first plurality of directions as the direction of the interference component, assign a second direction of the first plurality of directions as the direction of the interference component, wherein the received signal data processing unit is further configured to, based on the second direction of the first plurality of directions being assigned as the direction of the interference component, attempt to decode the data signal, and wherein the received signal data processing unit is further configured to, in response to a success in decoding the data signal based on assigning the first direction of the first plurality of directions as the direction of the interference component, refrain from (i) assigning the second direction of the first plurality of directions as the direction of the interference component and (ii) attempting to decode the data signal based on assigning the second direction of the first plurality of directions as the direction of the interference component.

* * * * *